(12) United States Patent
Bureau et al.

(10) Patent No.: US 7,247,226 B2
(45) Date of Patent: Jul. 24, 2007

(54) COATING SUPPORT AND METHOD FOR THE SELECTIVE COATING OF CONDUCTIVE TRACKS ON ONE SUCH SUPPORT

(75) Inventors: Christophe Bureau, Suresnes (FR); François Perruchot, Issy les Moulineaux (FR); Christophe Kergueris, Grenoble (FR)

(73) Assignee: Alchimer S.A., Massy (FR)

( * ) Notice: Subject to any disclaimer, the term of this patent is extended or adjusted under 35 U.S.C. 154(b) by 0 days.

(21) Appl. No.: 10/525,833

(22) PCT Filed: Aug. 26, 2003

(86) PCT No.: PCT/FR03/50042

§ 371 (c)(1),
(2), (4) Date: Oct. 19, 2005

(87) PCT Pub. No.: WO2004/019385

PCT Pub. Date: Mar. 4, 2004

(65) Prior Publication Data

US 2006/0103018 A1    May 18, 2006

(30) Foreign Application Priority Data

Aug. 26, 2002   (FR) .................. 02 10566

(51) Int. Cl.
*C25D 5/02* (2006.01)
*H01L 23/48* (2006.01)

(52) U.S. Cl. .............. 205/125; 361/761; 438/534; 257/734

(58) Field of Classification Search ............ 205/125; 361/761
See application file for complete search history.

(56) References Cited

U.S. PATENT DOCUMENTS

| 6,036,834 A * | 3/2000 | Clerc ............... 205/118 |
| 6,137,183 A | 10/2000 | Sako |
| 6,140,144 A | 10/2000 | Najafi et al. |
| 6,144,023 A | 11/2000 | Clerc |
| 6,326,936 B1 | 12/2001 | Inganas et al. |

FOREIGN PATENT DOCUMENTS

| CA | 2 060 672 | 8/1992 |
| EP | 0 038 244 | 10/1981 |
| EP | 0 924 756 | 11/1983 |
| EP | 0 499 528 | 8/1992 |
| EP | 0 500 415 | 8/1992 |
| EP | 0 821 987 | 2/1998 |
| WO | WO 00/57467 | 9/2000 |

OTHER PUBLICATIONS

Fiaccabrino et al. "Array of individually addressable microelectrodes" *Sensors and Actuators B* 18-19:675-677 (1994).

* cited by examiner

*Primary Examiner*—Evan Pert
*Assistant Examiner*—Krista Soderholm
(74) *Attorney, Agent, or Firm*—Foley & Lardner LLP

(57) ABSTRACT

The present invention concerns a lining support comprising a plurality of conductive pads (12) associated with a shared addressing contact (18) and means of selecting at least one pad to be lined by electrochemical means among the plurality of pads. In accordance with the invention, the selection means comprise means (20) of shifting a polarisation voltage, connected between the shared addressing contact and at least one pad to be addressed.

Application to the lining of conductive pads.

31 Claims, 10 Drawing Sheets

COATING SUPPORT AND METHOD FOR THE SELECTIVE COATING OF CONDUCTIVE TRACKS ON ONE SUCH SUPPORT

This application is a national phase application of PCT Application No. PCT/FR03/050042, filed Aug. 26, 2003, which claims the benefit of French Patent Application No. 02/10566, filed Aug. 26, 2002, which are both hereby incorporated by reference.

TECHNICAL FIELD

The present invention concerns a support comprising conductive pads and a method of lining said pads by electrochemical means. Lining is taken to mean any deposition or attachment of a material at the surface of a pad of a support provided for this purpose.

STATE OF THE PRIOR ART

A technological background in the field of analysis supports covering various aspects of the invention is illustrated by documents (1) to (7), the references of which are detailed at the end of the present description.

An example of support as envisioned in the invention is given by the substrate used for the collective manufacture of biological or chemical analysis supports, also known as "biochips" in the field of biology. This substrate comprises one or several identical biochips that each have a plurality of conductive pads used as test pads. After cutting the substrate, these pads, previously functionalised with reagents or "probe molecules", are used to detect the presence in a given medium of target molecules or molecules to which the reagents are sensitive. In order to carry out a simultaneous analysis of different constituents of the medium, different pads must be previously lined with different reagents or different probe molecules. The lining generally takes place by immersing the support in a medium containing the lining material or a precursor of said lining material.

In a general manner, the considered support consists of a plurality of conductive pads. Identical pads requiring the same lining constitute a family of pads.

In order to obtain the selective lining of certain pads or a family of pads, while at the same time leaving other pads or other families of pads unlined for the subsequent deposition of another lining material, different techniques are known. A first technique consists in forming on the support a mask with openings that correspond respectively to the pads that have to be lined.

This technique is long and expensive because it requires a mask to be put in place and removed for each type of lining material to be deposited.

Another technique consists in depositing the lining material by electrochemical means. In this case, the selection of the pads that have to be lined takes place by selectively applying to the pads polarisation voltages that induce or, quite the reverse, that prohibit the deposition of the considered lining material. This deposition technique is easier to implement, particularly when there is a high number of conductive pads to be lined with different materials.

However, a problem of addressing the conductive pads is posed. The addressing may take place through the intermediary of addressing contacts, also conductive, which are respectively connected to the conductive pads to be lined. The addressing contacts are generally arranged at the edge of the support in such a way as to facilitate their coming into contact with an external addressing device provided to provide polarisation voltages.

The increase in the density of pads (number of pads per unit area) to be lined leads to the multiplication of the addressing contacts and leads to wiring difficulties.

A first known solution consists of using a unique addressing plot for each family of pads to be lined connected through the intermediary of an internal connection to all of the pads of the family. This solution poses a first problem when the pads of a same family are uniformly spread out on the surface of the support (which is the case when the support groups together a series of identical components). In this case, it is not possible for topological reasons to form different internal connections on a single surface. It is necessary to have available a technology that enables different internal connections to be crossed over. Moreover, here again the increase in the density of the pads is limited by the multiplication of the internal connections.

These disadvantages may be partially overcome by equipping the support with commutators capable of selectively connecting different conductive pads or different families of pads to be lined to a same addressing pad. The number of addressing contacts may thus be reduced. The commutators are, for example, in the form of a multiplexer addressing system.

The fact of equipping the addressing supports with commutators necessitates a new addressing control to govern the commutation state of said commutators. Moreover, resorting to commutator or multiplexer means considerably increases the cost of the supports, in particular because it reduces the surface area available for the conductive pads.

DESCRIPTION OF THE INVENTION

The aim of the invention is to propose a lined support or a bare support and a method of lining the bare or already partially lined support that does not have the disadvantages and limitations indicated above.

One aim of the invention is indeed to propose a method for selectively lining different pads of a support that does not make use of either a mask or commutators.

When the lining by electrochemical means stops at the same time as an electrochemical current, one describes the lining as electro-monitored lining. The growth of the lining necessitates the flow of a current.

Electro-monitored reactions are considered as electro-deposition, of metals or polymers (poly-electrolytes), electro-polymerisation of conductive polymer precursors (pyrrole, aniline, thiophene, EDOT, etc.), or even phenols, ethylene diamine and more generally diamines, etc.

The lining may also take place by electrochemical means when it is simply started or initiated by the application of a potential suited to the pad in question.

In an electro-initiated reaction lining medium, the lining only begins when the voltage applied to the conductive pads of the support exceeds a threshold. This threshold is linked to the medium, in other words to the lining material that one wishes to form or deposit, the nature of the solvent used to form the electrochemical solution or containing the lining medium and introduced in the electrochemical solution, and the chemical nature of the conductive pads of the support. However, the deposition process is essentially chemical. Thus the formation of the lining continues even after removing the polarisation voltage, in other words when the electrical circuit external to the electrochemical bath has been opened.

In the case of a lining by electro-initiated means, the growth of the lining coating on the lining pad begins at a potential known as the lining threshold potential or voltage. The lining is formed in an optimal manner for a voltage known as the saturation voltage. The difference between this saturation voltage and the threshold lining voltage is also known as the lining potential width.

To achieve these aims, the invention provides for a lining support comprising a plurality of conductive pads formed on a substrate associated with a shared addressing contact on which is applied a voltage by an external source and means of selecting among the plurality of pads at least one first group of pads to be lined by electrochemical means. The selection means comprise means of shifting the polarisation voltage that needs to be applied to a shared addressing contact to obtain a deposit at the level of a first group of pads electrically connected to the shared addressing contact without obtaining a deposit on a second group of pads electrically connected to the same shared addressing contact.

It is pointed out that a group of pads may only comprise one pad.

In order to attain this result, one may, according to a first variant of the invention, form the conductive pads of the first group with a first conductive material and the other pads with a second conductive material. This shift means is applicable when the lining material necessitates for the deposition polarisation voltages that are different when the conductive pad is formed in different materials.

According to a second variant of the invention, one provides voltage shift means connected between the shared addressing contact and at least one addressing pad. These shift means are used to modify, compared to the source, the potential applied at the level of the pad.

To all of these purposes, the invention relates to a lining support comprising a plurality of conductive pads formed on a substrate, associated with a shared addressing contact and means of selecting at least one pad to be lined by electrochemical means among the plurality of pads, characterised in that the selection means comprise resident means for shifting a polarisation voltage that needs to be applied to the shared addressing contact to obtain a deposit at the level of a first group of pads electrically coupled to the shared addressing contact without obtaining a deposit on a second group of pads electrically coupled to the same shared addressing contact.

As explained above, the means of shifting the voltage to be applied to the shared addressing contact are, in one embodiment, constituted by the fact that the conductive pads consist of a first conductive material, the pads of the second group consisting of a second conductive material different from the first material.

The first and second conductive materials consist for example of semi-conductor materials of the same nature having different dopings or of different conductors.

According to one of the embodiments as explained above, the voltage shift means comprise threshold means comprising at least one diode connected between the shared addressing contact and each of the pads of the second group.

The diode is polarised, for example, in the open sense from the shared addressing contact to at least one conductive pad.

According to one embodiment in which the pads of a second group of conductive pads are lined by an electro-initiated lining, the shift means comprise at least one electrical resistance of value (R) sufficient to prevent the lining of the pads of the second group under the application at the shared addressing contact of a voltage allowing the lining of the pads of the first group.

The resident means of shifting a polarisation voltage may comprise at least one resistor and at least one diode in series.

The lined pad may comprise a chosen lining element in order to form a chemical test pad, or a biological test pad, or a fusible material anchoring pad, or an electrical contact pad, or a mechanical contact pad, or a membrane, or a seismic weight of an accelerometer and a condenser plate.

When the substrate is a semi-conductor of a first type of conductivity, it may comprise a plurality of doped regions of a second type of conductivity, each doped region of the second type of conductivity being connected to at least one conductive pad constituting a surface of the substrate, the doped regions of the second type of conductivity forming with the substrate diode voltage shift means.

The invention further concerns a method for forming a support comprising lined conductive pads, in which one brings into contact the pads of the support with at least one medium containing a lining material, or a precursor of a lining material, and one applies at least one polarisation voltage between a shared addressing contact and a reference electrode, method characterised in that one forms conductive pads of the support with a first conductive material and others with a second conductive material, or one forms on the support voltage shift means arranged between the shared addressing contact and the first pads, in such a way that a voltage applied to the shared addressing contact corresponds to a first voltage value on the first pads and to a second voltage value on the second pads.

one applies to the shared addressing contact a voltage sufficient to initiate the lining of the first pads, and insufficient to allow the lining of the second conductive pads.

Preferably, the lining material, or the precursor of the lining material, leads, for at least one of the pads, to an electro-initiated lining.

Preferably, one uses a support in which the voltage shift means are threshold means, and one carries out a lining by electro-monitored or electro-initiated means.

In an embodiment of the method one uses a support in which the voltage shift means comprise at least one resistance and one carries out a lining by electro-initiated means.

Preferably, when the lining material is electro-initiated and in particular electrografted, one applies the polarisation voltage by carrying out at least one scan between a lower threshold and a polarisation voltage value exceeding a lining threshold.

When the reaction is electro-initiated, successive scans of the source voltage to obtain, at the level of the pad, a voltage variable between a lower threshold and an upper threshold that will be defined later, enabling the layer of lining to be made denser. At each scan, a reaction may be initiated on the sites of the conductive pads that have remained unlined during the previous scans. The sites of a pad where electro-initiated graftings have taken place are still designated as "sites". A sufficient number of scans makes it possible to attain a saturation of the sites enabling a homogeneous lining to be obtained even if there exists a dispersion in the shift means used for the pads intended to receive the same lining. In other words, all of the possible lining sites have been initiated. The dispersion of induced voltages, at the level of the pads to be lined, must be such that the voltage differences at the level of each pad provoked during the lining operation remain small compared to the width of potential of the lining underway.

In one embodiment of the lining method according to the invention, one forms a passivation lining in at least one first step of the method, by bringing the conductive pads into contact with a first medium and then, in a subsequent lining step, by bringing the conductive pads into contact with a second medium, in order to line the pads that have remained unlined during the first lining step, or during a previous lining step.

The fact of forming a passivation lining makes the pads already lined electrically insulating and therefore insensitive to subsequent lining treatments. It is thus possible to apply even higher polarisation voltages to initiate the growth of a lining for pads with a higher lining threshold. In a different lining medium, a new lining may also be provoked with a voltage that may be less than that required for the previous linings.

It should be recalled that the lining of a conductive pad is possible as soon as the polarisation voltage applied to the shared addressing contact is greater than a voltage threshold determined by the voltage shift means. This threshold may be increased by a supplementary threshold specific to the electro-initiated growth lining materials.

In an embodiment of the lining method according to the invention, one brings into contact the conductive pads with at least one medium suited to an electro-initiated lining, comprising at least one compound chosen from among vinylic monomers, cyclic monomers that may be cleaved by nucleophilic or electrophilic attack, diazonium salts, iodonium salts, sulphonium salts, phosphonium salts, and a mixture thereof.

In one embodiment of the lining method according to the invention, one brings into contact the pads of the support with at least one medium suited to an electro-monitored lining, comprising at least one compound chosen from among a metallic salt or a poly-electrolyte, or a precursor of conductive polymers (pyrrole, aniline, thiophene, EDOT, acetylene, and derivatives thereof) or a molecule that could be electro-polymerised (phenols, naphthols, etc., ethylene diamine, and more generally diamines and in particular alkyl diamines, etc.).

It has been stated above that the means of shifting the polarisation voltage are resident on the support. This means that these means are present on, for example, a finished chip or biochip or an electromechanical structure micromachined on silicon incorporating the support, even if said means only served for manufacturing the chip, or biochip or electromechanical structure micromachined on silicon, and are not used for its use or its functioning.

When the electrochemical method used is electro-monitored, the conduction threshold of the diodes connecting certain pads to the shared addressing contact may make it possible to prevent the flow of the electrochemical current necessary to obtain the lining on these plots.

When the electrochemical process used is electro-initiated, the conduction threshold of the diodes connecting certain pads to the shared addressing contact make it possible to reduce the value of the potential obtained at the level of these pads preventing the formation of the lining.

In both case, the lining is blocked on the pads connected through a diode if the following two conditions are met: the polarisation potential applied at the level of the source remains less than the sum of the threshold potential for starting the lining and the diode conduction threshold potential; the leak current of the diodes is considerably less than the typical electrochemical current used for the lining. Moreover, in order to attain the best lining conditions on the pads connected directly to the shared addressing contact, the diodes are chosen so that their conduction threshold is at least of the same order of magnitude as the width of the lining potential of the considered reaction.

It is thus possible, by means of one or several diodes placed in series, to create a voltage threshold between pads connected for example directly to a shared addressing point and pads connected to this same shared addressing point through diodes.

For a given pad and type of lining, the maximum electrochemical current that can be obtained without setting off the electro-initiated reaction being known, a resistance is considered as a voltage shift means if it provokes, in said current, a significant potential drop, ideally greater than the width of the lining potential. This makes it possible to distinguish the electrical resistances used as voltage shift means and the access resistances that correspond to the wiring resistance of the electrical addressing means. These latter resistances may have values considerably below the minimum value of a shift resistance.

Other characteristics and advantages of the invention will become clear from the description that follows, while referring to the appended figures and drawings. This description is given purely by way of indication and is in nowise limitative.

DETAILED DESCRIPTION OF SPECIFIC EMBODIMENTS

In the following description, identical, similar or equivalent parts of the different figures are marked by the same reference signs in order to facilitate comparison between figures. Moreover, in order to make the figures clearer, not all of the elements are represented on the same scale.

Figure 1A:
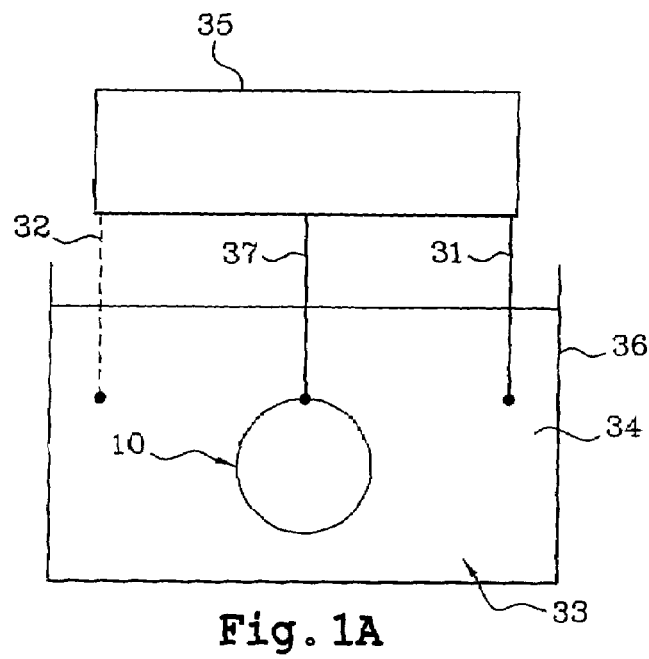
FIG. 1A is a simplified schematic representation of a lining support immersed in a three electrode bath.

In reference to FIG. 1A, an example of assembly known in itself used to form a support 10 is preferably a three electrode assembly. The assembly comprises a vessel 36, containing a bath 34. The support 10 connected to a working electrode 37, a reference electrode 32, and a counter-electrode 31 are plunged in the bath 34. A potentiostat 35 is connected to the working electrode 37 connected to the support 10, to the reference electrode 32 and to the counter-electrode 31. In the 3 electrode assembly used, the potentials are measured compared to the reference electrode 32.

The assembly can also be only with two electrodes (working electrode and counter-electrode) and in this case the potentials V are referenced in relation to the counter-electrode 31.

An electrochemical circuit 33 consists of the potentiostat 35, the electrodes 31, 37 and 32 or in certain cases the electrodes 31 and 37 only, the bath 34, the support 10 and the connections between these elements as represented in FIG. 1A.

One applies a potential to the support 10 either by a 3 electrode assembly, or by a 2 electrode assembly, in such a way that this potential is equal to a value V given in relation to a reference. The reference 35 indicates a potentiostat for forming an assembly preferably with 3 electrodes.

Figure 1B:
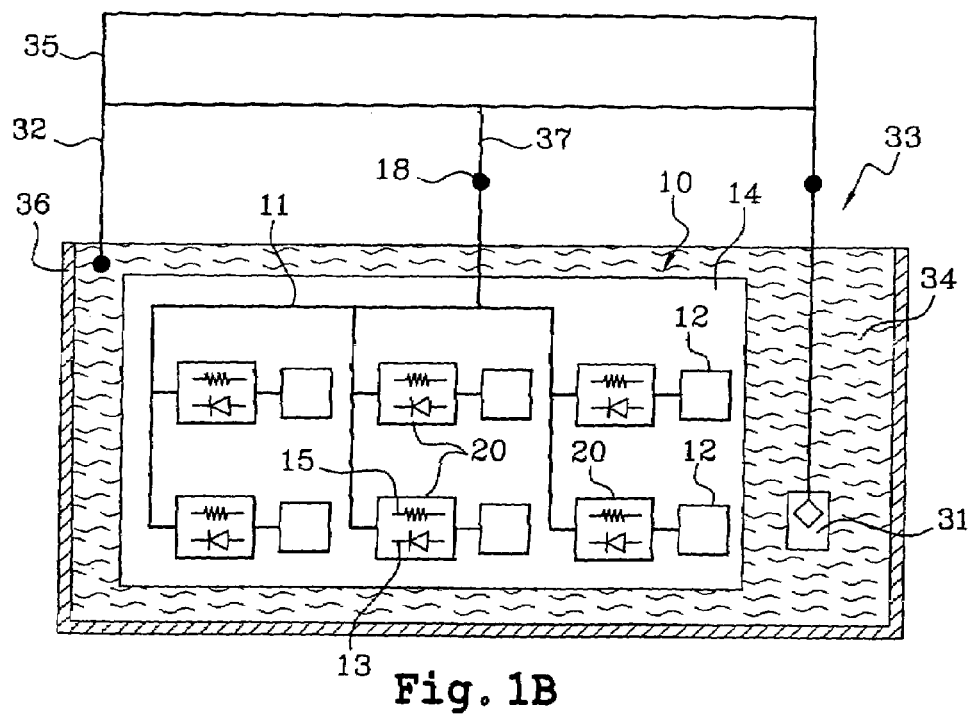
FIG. 1B is a simplified schematic representation of a lining support according to the invention and of an electrochemical lining circuit formed with such a support.

FIG. 1B shows a specific lining support 10, according to the invention immersed in a vessel 36 containing the bath 34.

The lining support 10 comprises a plurality of conductive pads 12 arranged on a substrate 14. The pads 12 are capable of receiving a lining by electrochemical means. In the example illustrated, the conductive pads 12 are identical to each other and arranged according to an ordered distribution pattern. The distribution and the shape of the conductive pads 12 may however be very variable. All of the pads 12 are electrically connected by a shared electrode 11 to a shared addressing contact, symbolically marked with reference 18 in FIG. 1*b*. Each of the pads 12 is electrically in series with one or several components 20 intended to shift the polarisation voltage obtained on the considered pad 12 when the support 10 is connected in an electrochemical circuit 33. The components 20, as a whole, form part of means intended to select one or several pads 12 to be lined. The components comprise one or several diodes 13, and/or one or several electrical resistances 15. Several diodes 13 can be connected in series between each other. In the same way, one or several diodes 13 may be connected in series with one or several electrical resistances 15.

The composition of the electrochemical bath may be widely variable as a function of the type of lining that one wishes to form on the conductive pads. As indicated in the first part of the description, one distinguishes media suited to an electro-initiated lining and media suited to an electro-monitored lining.

In an electro-monitored reaction lining medium, the lining is initiated as soon as the current that flows in the electrochemical circuit is not zero, however weak it actually is. On the other hand, the growth of the lining is automatically interrupted when the electrical circuit is open.

In an electro-initiated reaction lining medium, the lining is not initiated when the current begins to flow. The lining is only initiated when the voltage applied to the conductive pads of the support exceeds a threshold. Unlike electro-monitored reactions, there exists a range of potentials lower than the threshold potential where the current flows but one does not have lining growth. This threshold is linked to the medium, in other words to the lining material that one wishes to form or deposit, the nature of a solvent used to form the electrochemical solution or containing the lining medium and introduced in the electrochemical solution, and the chemical nature of the conductive pads of the support. However, the deposition process is essentially chemical. Thus, the formation of the lining may continue even after having eliminated the polarisation voltage, in other words when the electric circuit external to the electrochemical bath has been opened.

Figure 1C:
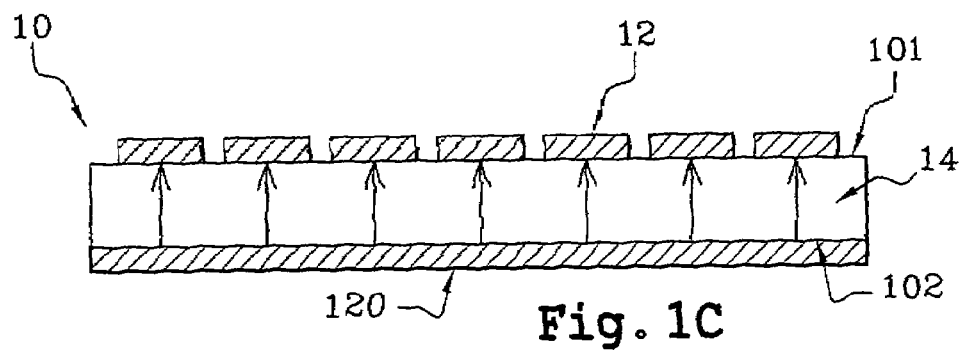
FIG. 1C is a schematic cross-section of an embodiment of the invention.
Figure 1D:
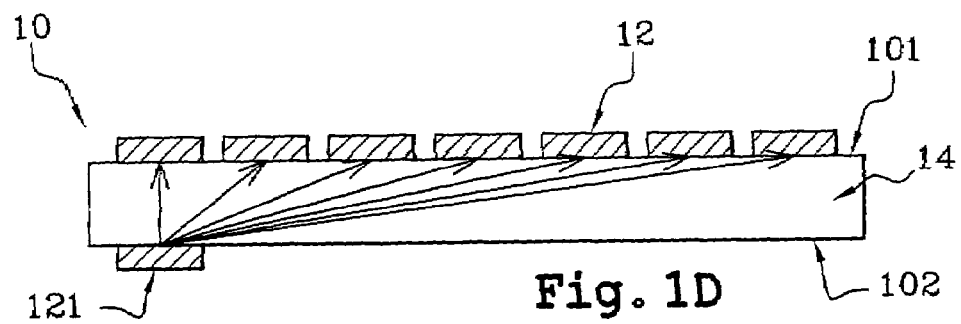
FIG. 1D is a schematic cross-section of an embodiment of the invention.

FIGS. 1C and 1D, illustrate an embodiment of the invention.

In these embodiments, the support 10 comprises a semi-conductive substrate 14 on which conductive pads 12 are arranged on a first face 101 of the support 10. A face 102 opposite the first face 101 of the semi-conductive substrate 14, comprises a shared addressing contact 18.

According to a first embodiment illustrated in FIG. 1C, the pad 18 is in the form of a conductive layer 120. It makes it possible to electrically connect all of the conductive pads 12 through the intermediary of a same access resistance due to the resistivity of the substrate 14, the pads 12 all being equidistant from the conductive plane 120. The application of a voltage to the shared addressing contact 120 makes it possible to apply an identical voltage on all of the conductive pads 12, simply lower due to the ohmic drop linked to the substrate (drop that may be compensated by the source applying the voltage to the shared addressing contact). An identical lining may thus be obtained on all of the conductive pads 12.

According to a second embodiment illustrated in FIG. 1D, the substrate 14 is resistive and the addressing contact 18 is in the form of a conductive plot 121 in a position not equidistant from the conductive pads 12. The substrate has a resistivity of a sufficient value to prevent the lining of at least one conductive pad 12 of the support under the application at the shared addressing contact 121 of a voltage allowing the lining of at least one other pad 12 of the support 10.

Figure 2:
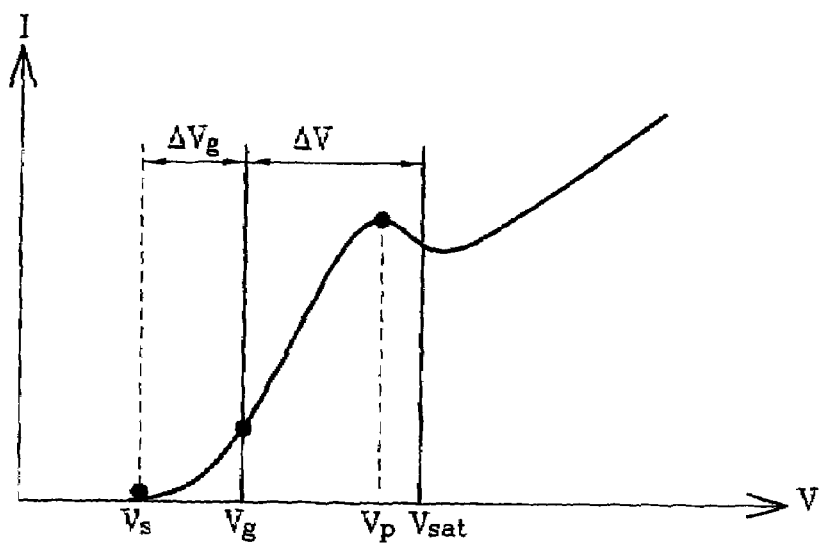
FIG. 2 is a diagram indicating, as a function of a polarisation voltage applied to a conductive pad of a lining support, the electrochemical current flowing in an electrolytic lining circuit.

FIG. 2 is a diagram, more precisely a voltammogram, indicating on the Y-axis the evolution of an electrochemical current in the circuit 33 as shown in FIGS. 1*a* and 1*b*. The current is given as a function of a potential measured between a conductive pad 12 and reference electrode 32. This potential is shown on the X axis. This diagram therefore does not take account of the existence of the selection means 20 and therefore any difference between the potential applied by the potentiostat 35 and the potential obtained on the pad 12. The current I and voltage U are indicated on an arbitrary scale.

The diagram of FIG. 2, given by way of illustration, corresponds to a specific lining method obtained by electro-initiated reaction: it involves electro-grafting, such as may be obtained by electro-reduction or electro-oxidation of vinylic monomers or cyclic monomers that may be cleaved by nucleophilic or electrophilic attack, or even by the electro-reduction or the electro-oxidation of electro-cleavable precursors (in particular when their reduction or oxidation products are radicals), and particularly the electro-reduction of diazonium, sulphonium, phosphonium or iodonium salts. The electrografting of monomers enables polymers to be fixed, in a covalent manner, on the conductive or semi-conductive pads. These polymers "grow" on the surface from the first monomer electro-reduced on the surface, by chemical growth. Only the first step of anchoring the first monomer on the surface is electrochemical, the growth being purely chemical. It is therefore indeed an electro-initiated reaction. The electro-grafting of diazonium salts and analogues therefore leads—in general—to layers that do not grow. This is therefore a specific case of an electro-initiated reaction, reduced to its most simple expression.

In the following description, the voltages are given in absolute value, and are implicitly those of the working electrode, measured in relation to a reference electrode. As indicated above, they only correspond to the voltage actually applied experimentally in the case of a 3 electrode assembly (it being assumed that the ohmic drop in the electrochemical circuit is compensated by the potentiostat). In the case of a 2 electrode assembly, it would have been necessary to impose a voltage V' different from V, not detailed on the graph. Their polarity, constant for a given lining, is known as the lining polarity.

When the polarisation voltage is between a zero value and a start value Vs, a very weak, even undetectable, electrical current flows in the circuit. Whatever the case, this current is insufficient to produce a deposit detectable later by surface analysis means. One will consider, given this fact and given the desired objectives, that the copolymerisation considered here is an electro-initiated reaction that only takes place as of a minimum polarisation voltage.

From the start voltage and up to a lining threshold voltage Vg, a weak current flows in the electrochemical circuit. This current does not necessarily result in a lining phenomenon. It corresponds to competitive parasite reactions that essentially promote a coupled chemistry that takes place in solution, and therefore do not deliver a significant organic deposition.

Indeed, the electrochemical current flowing in the circuit is not exactly correlated to the growth of a lining material on the conductive pads. The electrochemical current results in at least two separate and competing phenomena. A first phenomenon is the desired phenomenon corresponding to the formation of the lining on the conductive pads. Another phenomenon corresponds to the parasite formation of polymers in the electrochemical bath, independently of the lining support. The polymers thus formed may attach themselves to the conductive pads by physical sorption but their attachment is not stable, they are eliminated by rinsing.

The actual lining is established from the threshold voltage Vg. One designates by Vsat a potential known as the "saturation potential", which is in general greater than the peak potential Vp. This potential is a potential from which the thickness of the grafted material does not change with the time of applying the voltage to the conductive pad. Said thickness is the asymptotic limit of the maximum thickness that one may obtain in a given electrolytic bath. This potential also corresponds to a minimum value that makes it possible, from voltametric potential scans carried out between a value less than or equal to Vg and a stopping value greater than or equal to this minimum value Vsat, to obtain curves—one curve per stopping value—giving the thickness of the film as a function of the number of cycles, for example under voltametric or multi-slot conditions, the different curves obtained having all this same asymptote, independently of the exact value of the stopping potential used. It is also the minimum potential with which, if one carries out a sufficient number of voltametric cycles between a value less than or equal to Vg and greater than or equal to Vsat, one succeeds in saturating the metallic sites of conductive pads in electrografted polymer chains. In the voltage interval between Vg and Vsat, the lining phenomenon is predominant. This interval is known as the width of the lining potential.

By further increasing the polarisation voltage, beyond Vsat, the phenomenon of lining of the conductive pads become a minority phenomenon compared to other competing phenomena such as the formation of materials in solution in the electrochemical bath, but the deposition of electrografted polymers at the surface is stabilised.

Thus, the polarisation of the pads to be lined is ideally maintained at least equal to the saturation potential Vsat.

The electro-monitored reactions, for their part, have the shared characteristic of causing the formation of a deposit (not grafted in the case of organic deposits), in which the quantity of material—thus in general the thickness—is proportional to the charge (time integral of the electric current) flowing in the circuit during the protocol. The lining starts at the same time as the current and stops with the current.

Figure 3:
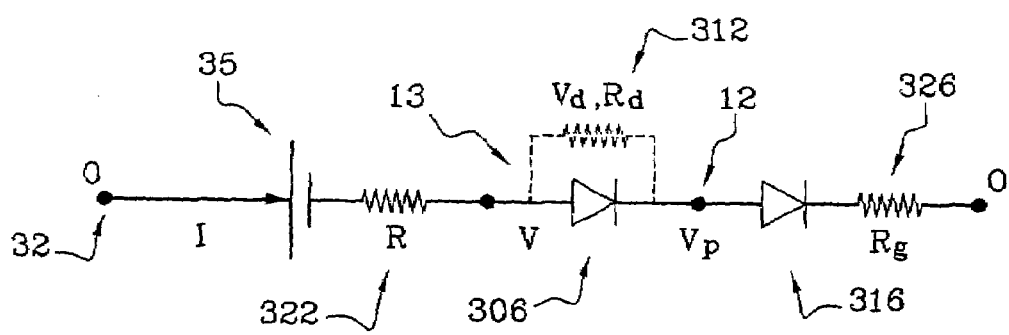
FIG. 3 is a modelling of the electrical circuit describing the complete electrochemical circuit.

FIG. 3 models the addressing circuit seen by a conductive pad. During the lining phase, the potential V existing between a conductive pad 12 to be lined and the reference electrode 32 depends on the current flowing in the different impedances constituting the addressing circuit.

In order to understand the importance of the different parameters and their possible consequences on the lining, it is necessary to analyse the effects of the different impedances present in this circuit.

The model used comprises firstly a resistor R 322 that takes into account the potential drop due to the shared electrode 11. In relation to FIG. 1b, it is, for a given pad, the resistance due to the length of the line 11 connecting this pad 12 to the shared connection point 18. This resistance is variable depending on the different lengths of line. The current Ic flowing through the resistor 322 placed between the source 35 and a conductive pad 12 is the sum of the electrochemical currents. It induces a potential drop:

$$\delta V = R \cdot Ic$$

This current shows a maximum Im with regard to the peak potential Vp for the domain used. If one assumes that the operator imposes a potential V=Vsat+δVsat, then as long as the ddp difference of potential δVsat is high compared to the maximum potential drop due to the resistance R, i.e. δVmax=R·Im, the voltammogram, therefore the grafting potential zone, is little modified by the presence of the resistance. In other words, as long as δVmax≦δVsat, the potential is everywhere greater than Vsat, and the film deposited by electro-initiated reaction is everywhere of the same thickness, whatever the cartography of the local ohmic drop on the working electrode. This condition is met when the value of the resistance in series R is low compared to the differential impedance Rg for treatment of the pad defined by $$Rg = (Vp - Vg)/Im$$

Generally, the resistance R is an equivalent resistance determined from the potential drop along the shared electrode 11 between the conductive pad to be lined and the source 35, calculated for the maximum current value flowing through it divided by the current necessary to treat the pad. In calculating this resistance R, one must in particular take account of the current effect necessary for the simultaneous treatment of other pads. This resistance R is known as the access resistance or pad electrode resistance.

Furthermore, the maximum electrochemical current Im corresponds to a current density per unit area to be grafted. It is therefore proportional to the surface area of the pad. This current density makes it possible to define by analogy a differential treatment surface resistance characteristic of the electrochemical method used.

A first order of magnitude for the resistance not to be exceeded for the access resistance R may be given by the following approach. The typical value measured for the grafting, for the current density is around 1 mA/cm2. For pads with sides of 100 µm, this corresponds to a current of 100 nA. The typical width of the grafting zone ΔV is around 300 mV. This gives a differential grafting impedance Rg of around 3 MΩ. For the conductive pads that will be individually supplied by an electrode of resistance R, as long as this resistance R is low compared to this value, the ohmic drop due to the shared electrode 11 has no effect on the lining. The generalisation is realised by replacing the resistance R by the electrode resistance of the pad cited above.

Figure 4:
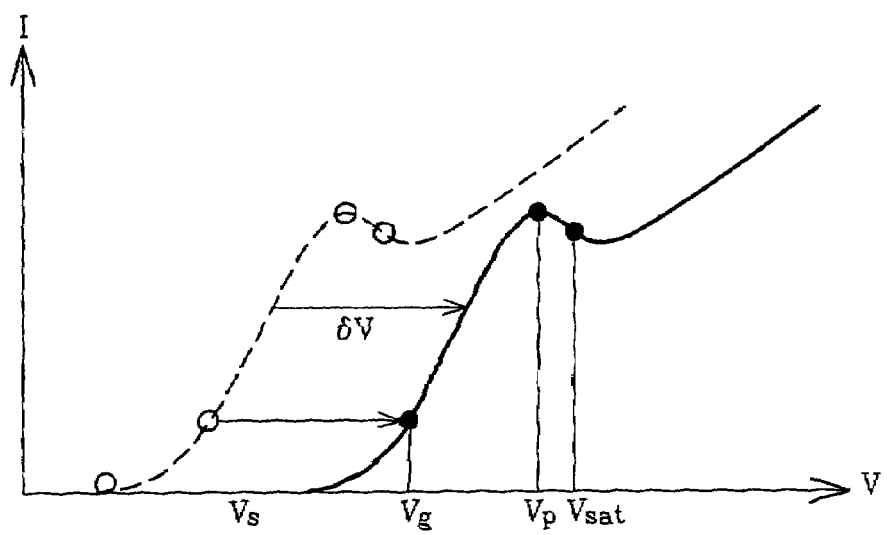
FIGS. 4 and 5 are diagrams indicating modifications to the diagram of FIG. 2, caused by applying the polarisation voltage to a shared addressing contact of a support according to the invention.

FIG. 4 is another voltammogram established as a function of a voltage Vr measured no longer on the conductive pads 12 but on the shared addressing contact 18. Consequently it takes account of the influence of the means of selection 20.

The voltammogram of FIG. 4 is established under the same conditions as those of FIG. 2, in the specific case where the selection means are threshold means and, in this instance, a diode. In order to facilitate comparison between the curves of FIGS. 2 and 4, the curve of FIG. 2 is reproduced as a broken line on the diagram of FIG. 4.

To model the effect of the diode 13 intercalated between the shared electrode 11 and the conductive pad 12, it is necessary to return to the electrical model proposed in FIG. 3 by examining the transitory effects corresponding to the establishment of the potential. In a very simple model, the modelling of the voltammogram of FIG. 4 may be obtained from an electrical circuit comprising an imaginary diode 316, of threshold Vs associated with a resistor in series Rg 326, enabling the slope of the voltammogram to be taken into account. The diode 13 used as shift means may be modelled by a perfect diode 306 associated with a resistor 312 Rd in parallel enabling the leak currents to be taken into account. The model assumes that the electrochemical current before the threshold Vs is below the leak current of the intercalated diode 306.

From an initial situation where all of the potentials are zero, the increase in the potential Vr applied at the level of the source 35 results in the appearance of a weak leak current through the resistor Rg making it possible to electrically charge the conductive pad 12: the potential V at the level of the conductive pad 12 is equal to the potential Vr. As long as these potentials remain below the threshold Vs, there is no electrochemical reaction. When the potentials V and Vr attain the value Vs, there is appearance of a first electrochemical current essentially stemming from the chemistry in solution. This current creates a shift between Vr and V stemming from the resistor Rd. The potential V at the level of the conductive pad is therefore less than the potential Vr applied by the source. The asymptotic value of this difference is Vd, which corresponds to the conduction threshold of the diode. For high leak resistances, the asymptote is attained before the current is sufficient to set off the lining.

One therefore indeed observes that the new curve is shifted and, more precisely, translated from a value δV equal to Vd to higher voltage values. The shift δV corresponds to the conduction threshold of one or several diodes in series that form the shift means.

In an electrochemical bath containing one or several species of lining materials, with or without lining threshold, it is therefore possible to selectively allow the lining of certain pads not provided with shift means or provided with shift means of low amplitude, while at the same time preventing the lining of other pads associated with shift means of higher amplitude. The amplitude of the shift is linked to the conduction threshold of the diodes. The application of an identical voltage Vr by the source will result in different local voltages V setting off or not setting off the lining depending on the choice of the maximum polarisation value. For example, if a first group of pads is not associated with shift means and a second group of pads is associated with diodes of threshold Vd greater than δV, an applied voltage of maximum value Vsat will allow the lining of the first group of pads but will not be sufficient for the lining of the second group of pads.

The lining pads not yet lined may be lined subsequently in an identical or different bath under the application at the shared addressing contact of a polarisation voltage exceeding the voltage shift and making it possible, should this happen, to overcome the lining threshold of the lining species present. It is important here not to confuse the lining thresholds Vg of the species suited to a lining by electro-initiated means and the conduction thresholds δV or Vd of the diodes forming the shift means.

If the following electrochemical bath is different, the lining thresholds Vg may be lower than those of the first bath. A lining of the conductive pads not yet lined may take place under the application of a polarisation voltage that may be lower than that previously applied. The pads already lined are no longer affected by the new polarisation when the lining coating saturates the available surface, or when said coating is electrically insulating.

If the lining support is maintained in the same bath also containing lining species with a higher threshold, the pads not yet lined, or at least some of them, may be lined by applying a sufficient voltage to the shared addressing contact. This voltage is then in particular sufficient to overcome the voltage shift δV and attain or exceed the lining threshold voltage Vg of the species that one wishes to deposit.

The association of different lining pads with different threshold selection means, with different thresholds, thus indeed enables different families of conductive pads that may be lined selectively to be distinguished.

Figure 5:
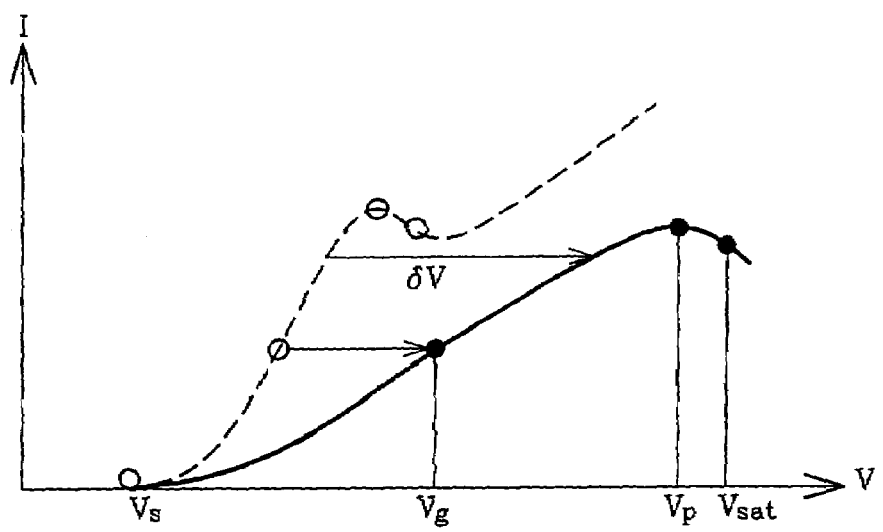

FIG. 5 indicates another voltammogram also established as a function of a voltage Vr measured between the reference electrode 32 and the shared addressing contact 18. The voltammogram of FIG. 5 thus also takes account of the influence of the selection means 20.

The voltammogram of FIG. 5 is comparable to that of FIG. 4. It is established for a conductive pad under the same conditions as those in FIG. 2, apart from the fact that the selection means are means without a threshold. In this instance, it is a resistor 15. In order to facilitate comparison between the curves of FIGS. 2 and 5, the curve of FIG. 2 is reproduced as a broken line on the diagram of FIG. 5.

The effect of the intercalated resistor has already been indirectly studied during the description of the effect of the shared electrode 11.

One observes that the new curve is also shifted. However, it is not a translation shift, as in FIG. 4, but a shift proportional to the electrolytic current I. The result is a deformation of the curve as a function of the polarisation voltage. More precisely, the shift δV between the curve represented in FIG. 2, and the curve resulting from the introduction of a shift means in the form of a resistor 15, as represented as a solid line in FIG. 5, is such that δV=R×I where R is the resistance value of the shift means. For a weak or zero current, the shift is inexistent. The threshold voltages Vs of the two curves of FIG. 5 are therefore mixed up.

The shift δV introduced by the resistance means enables a selection in the same way as the shift introduced by the diode.

Nevertheless, it should be pointed out that for materials deposited by electro-monitored reaction, such as an electrolyse for example, the lining starts as soon as a non zero current flows. For these specific materials, the shift means of the invention cannot be purely resistive means. Indeed, the shift δV by a resistance assumes the flow of a significant current, yet the flow of a current, even weak, is sufficient to cause a parasite electro-monitored lining on the non-selected conductive pads. On the other hand, the shift means may be threshold shift means, in other words comprise a component such as a diode. The selection of the pads to be lined is then made by the fact that the voltage applied to the shared addressing contact exceeds or not the conduction threshold of the diode.

In any case, it should be noted that it is more difficult to envisage a high spatial resolution with electrochemical techniques leading to organic coatings in which the thickness is a sharply increasing function of the treatment time and the local potential value, which is particularly the case for electro-monitored reactions. The least inhomogeneity of potential, caused by the different ohmic drops for example, leads to very different thicknesses resulting in important fringing effects. By fringing effects is meant that the lining is not restricted to the surface of the conductive pad to which it is applied, but extends beyond this pad in proportions that are poorly controlled.

On the other hand, the electrochemical grafting from electro-initiated reactions using monomers such as those listed above make it possible to carry out a localised grafting because it is by nature less sensitive to potential inhomogeneities. This localised grafting allows supports with a high density of pads to be treated, without using masks.

In the case of electrografting, the thickness of the coating formed from an electro-initiated reaction depends on the length of the chain forming the molecule of the grafted polymer and the grafting density. The method leads to a rapid local saturation of the thickness of the coating, allowing the fringing effects to be limited.

Only the density is a function that depends on the electrochemical kinetics of the grafting reaction. A first level of homogeneity of the coating is obtained as soon as the potential at the surface of each pad is in a window of potential ensuring a minimum grafting kinetic. This less restrictive condition facilitates the practical implementation of an addressing using impedance means that, by their nature, can increase the inhomogeneities of the potential.

When thickness homogeneity is a critical parameter for the quality of the coating obtained, the potential variations caused by the internal resistance of the shared electrode 11 or by the dispersion on the properties of the diodes can even be compensated by using the method in a saturation mode: by repeating the voltage scan beyond the saturation potential up to obtaining a saturation of the number of grafted sites, the thickness of the coating is an intrinsic value that no longer depends on the exact value of the local potential but only its presence in a window of potential.

FIGS. 6 to 9 are voltammograms illustrating the successive steps of lining of a support. In order to simplify matters, one considers that said support only comprises two families of conductive pads noted A and B, associated with selection means in the form of threshold shift means. More precisely, one considers that a first family A of conductive pads is connected to the shared addressing contact 18 without shift means or with means introducing a weak shift, whereas the second family B is connected to it by means introducing a more important shift.

The diagrams of FIGS. 6 to 9 correspond to the electro-initiated grafting of a lining material.

Figure 6:
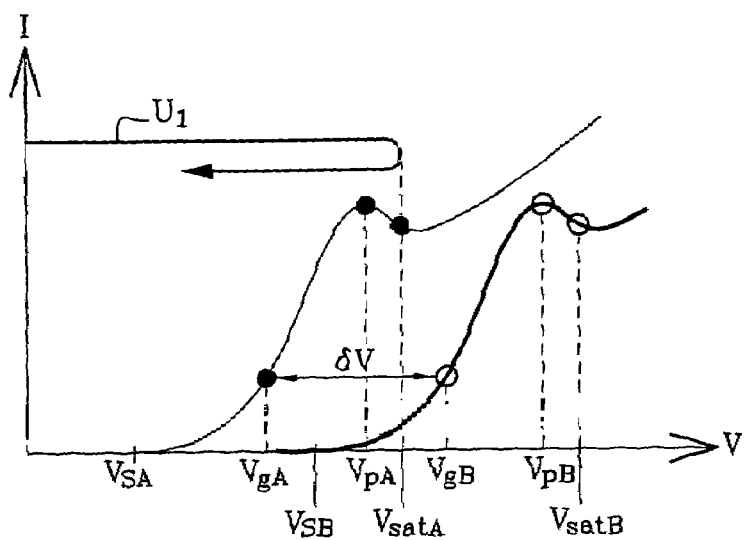
FIGS. 6 to 9 are diagrams indicating the evolution of an electrochemical current in an electro-initiated lining medium during successive steps of a lining method of a first type of support according to the invention.

FIG. 6 shows voltammogram curves for an applied voltage Vr that corresponds respectively to the two families of conductive pads A and B. The curves are shifted on account of the shift means. In this case, it involves threshold means. The shift means are chosen in such a way that the lining threshold VgB of the second family of conductive pads is greater than the saturation potential VsatA of the first family of conductive pads. The references VsA, VsB, VgA and VgB, VsatA and VsatB respectively indicate the start thresholds, the lining thresholds and the saturation potentials of the two curves corresponding to the families A and B measured between the reference electrode and the source, thus taking account of the presence of different shift means on the families.

In the example illustrated, the application of an electrochemical potential $U_1$ is not of the "all or nothing" type but takes place by successive scans between an initial value less than the lining threshold potential VgA and a value VsatA, greater than VgA corresponding to the first family of conductive pads. As soon as the applied voltage exceeds the first lining threshold $Vg_A$, a grafting of the lining material is initiated on the pads of the family A. On the other hand, since the applied voltage remains below $Vg_B$, no lining is formed on the pads of the second family B. It should be pointed out that the voltage VsatA is lower than the voltage VgB.

After a return towards zero or below the threshold potential VsA of the applied voltage, the lining process continues on the sites of the conductive pads where a grafting has been initiated. This phenomenon is not shown in the figures in so far as it is not linked to an electrochemical current in the circuit external to the lining bath. To multiply the number of grafting sites, one can carry out other scans of the polarisation voltage $U_1$ while always limiting oneself to values less than the lining threshold of the conductive pads of the second family B.

Figure 7:
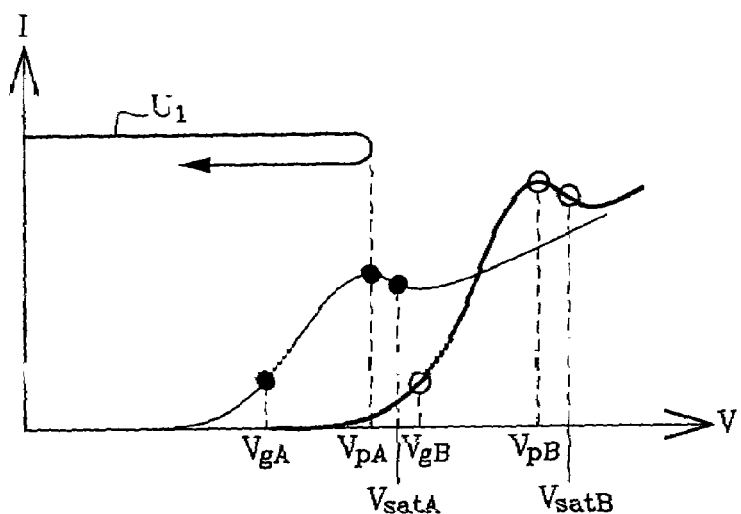
Figure 8:
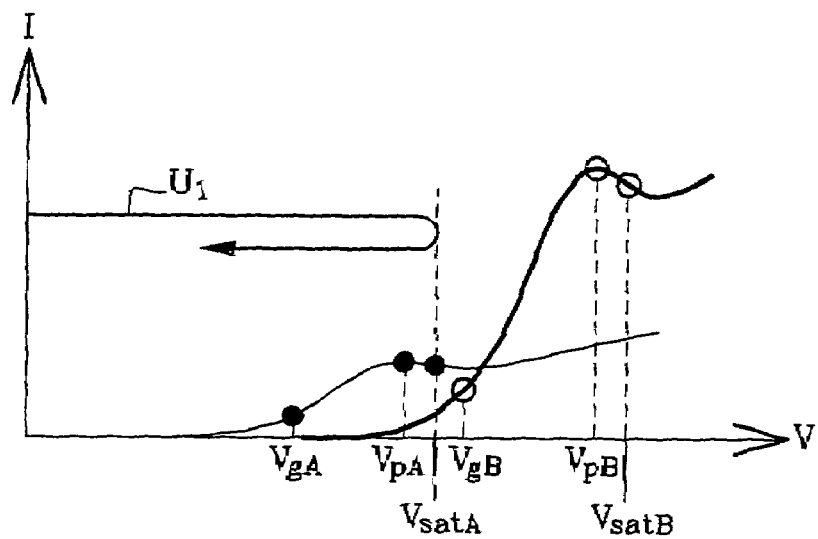

FIGS. 7 and 8 show voltammograms corresponding to the successive scans of the polarisation voltage. One observes that the electrochemical current of the voltammogram relating to the first family A of conductive pads falls for a same polarisation voltage. This results from the saturation of the conductive pads on which an always smaller number of sites are free and may be the subject of a grafting electro-initiation.

In other words, after a certain number of scans, the conductive pads of the first family A are fully lined and can no longer accommodate new lining molecules. In a specific case where the lining material has electrical insulation properties, the conductive pads of the first family A are made passive.

Figure 9:
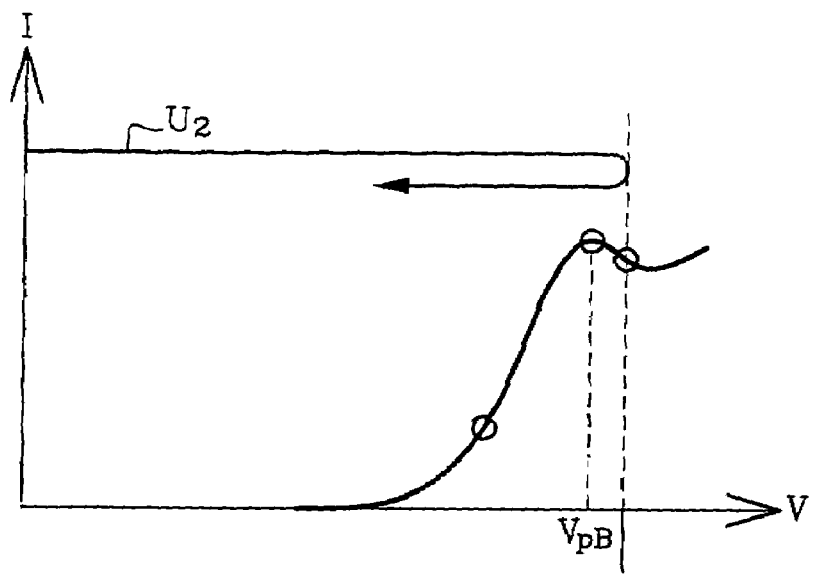
Figure 10:
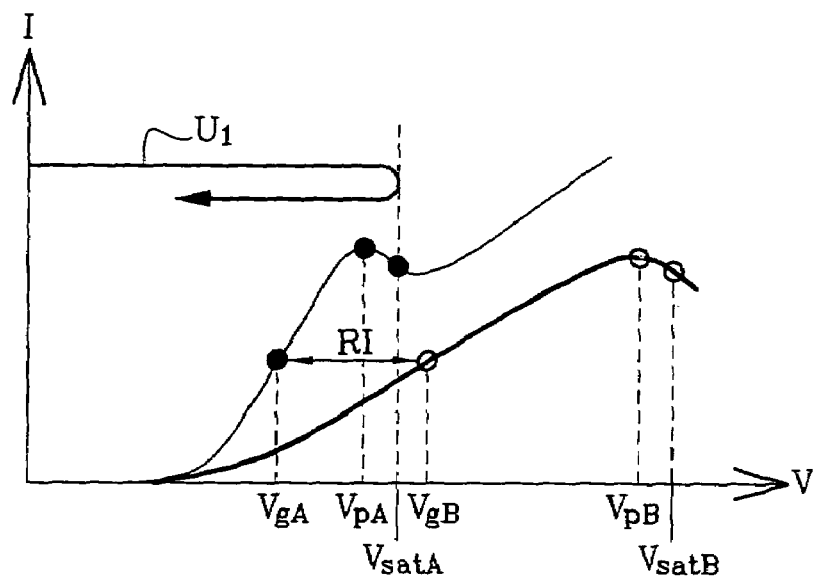
FIGS. 10 to 13 are diagrams indicating the evolution of an electrochemical current in an electro-initiated lining medium during successive steps of a lining method of a second type of support according to the invention.
Figure 11:
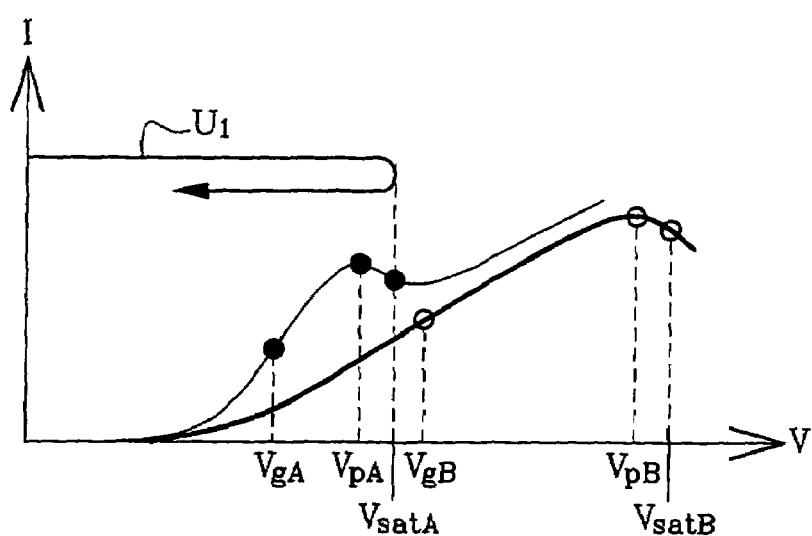
Figure 12:
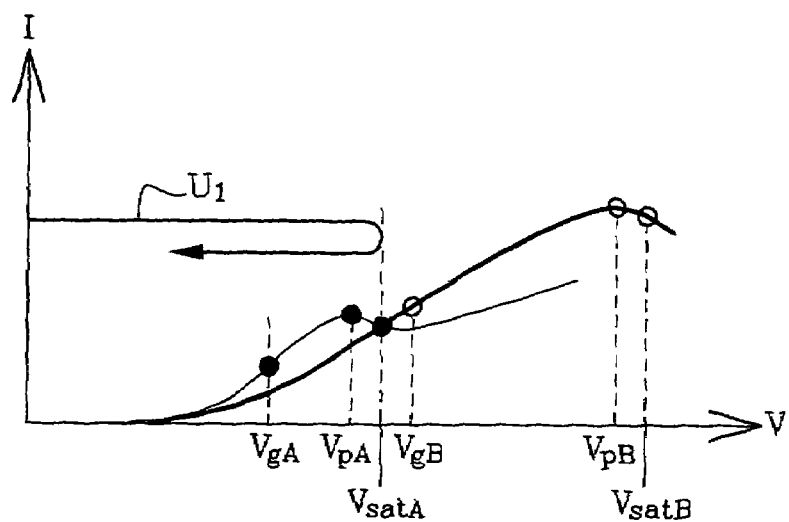

At this moment, when one also wishes to line the conductive pads of the second family, one may, as shown in FIG. 9, carry out the scans at a higher polarisation voltage $U_2$.

According to another possibility, in which one brings into contact the lining support with another electrochemical bath, with lining species that may have a different threshold, scans with different voltages may also be carried out. It suffices that the polarisation voltage exceeds the threshold imposed by the shift means and attains the lining threshold of a lining species capable of being formed. The previously lined pads remain insensitive to the new treatment, particularly when their previous lining is insulating: "insulating lining" is here taken to mean a lining that prevents the restarting of an electro-initiated reaction. If this new reaction is for example an electro-grafting reaction, (i) the non swelling of the first lining by a solvent of the new reaction; (ii) the insolubility of the monomer of the new reaction in the first lining; (iii) the maximum occupation (maximum level of grafting) of the sites of the conductive pad due to the fact of the first lining; are—independently—causes that could lead to an insulation (in the electrochemical sense) of the pad already lined.

FIGS. 10 to 13 are diagrams identical to those of FIGS. 6 to 9, apart from the fact that they are established for a lining support in which the selection means are not of the threshold type. The selection means comprise shift means in the form of electrical resistances.

Due to the fact that the shift means only comprise resistances, the shift between the curves relative to the families A and B of the conductive pads increases with the electrochemical current and thus with the applied polarisation voltage. As in the above-mentioned example, the voltage U1 is applied by successive scans between an initial value less than the lining threshold potential VgA and a value VsatA, above VgA, sufficiently low to not attain the lining threshold voltage VgB of the conductive pads of the second family.

It should be recalled that the resistance selection means make it possible to obtain a selective lining despite a weak electrochemical current. This is due to the fact that the lining reactions, as it happens the grafting reactions, are here electro-initiated reactions having specific thresholds. Said thresholds are specific to the lining materials and therefore independent of the selection means. When the lining materials do not have a specific reaction threshold, one uses threshold selection means, as indicated previously.

Figure 13:
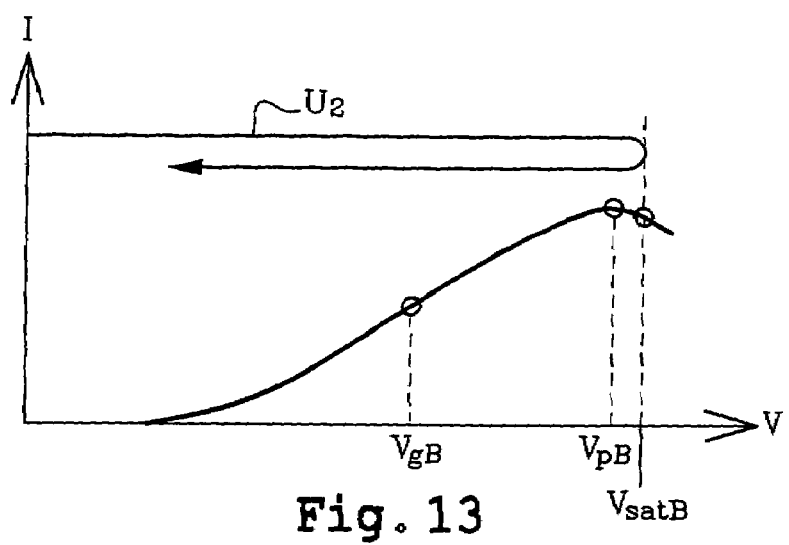

During a final step corresponding to FIG. 13, one carries out new polarisation voltage scans covering the interval between the lining threshold VgB and the saturation potential VsatB of the conductive pads of the second family B, brought into contact with an electrochemical bath containing one or several other lining species. In the example illustrated, the polarisation voltage scans are carried out with a voltage $U_2$ higher than $U_1$. If the threshold of the electro-initiated reaction of the lining material is lower, the scans can also be carried out with a lower voltage than previously. In so far as the shift means do not comprise a diode, it is not necessary to exceed a conduction threshold.

Figure 14A:
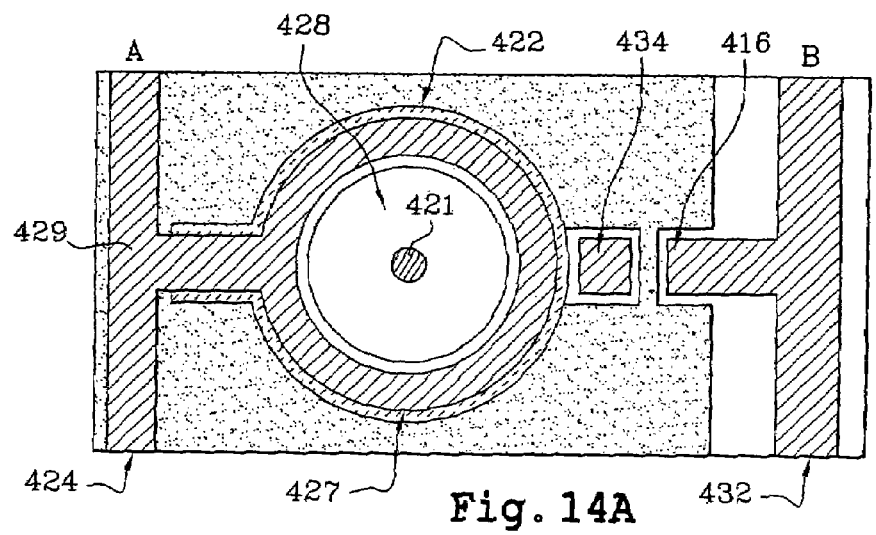
FIG. 14A is a simplified schematic cross-sectional view of a specific embodiment of a lining support according to the invention
Figure 14B:
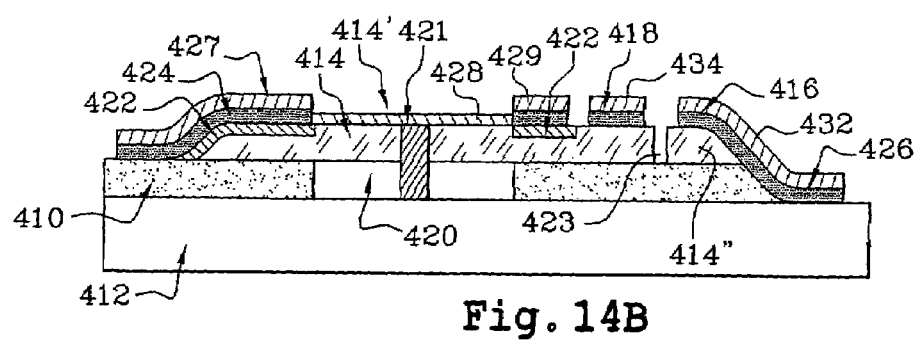
FIG. 14B represents a top view of the same support.
Figure 14C:
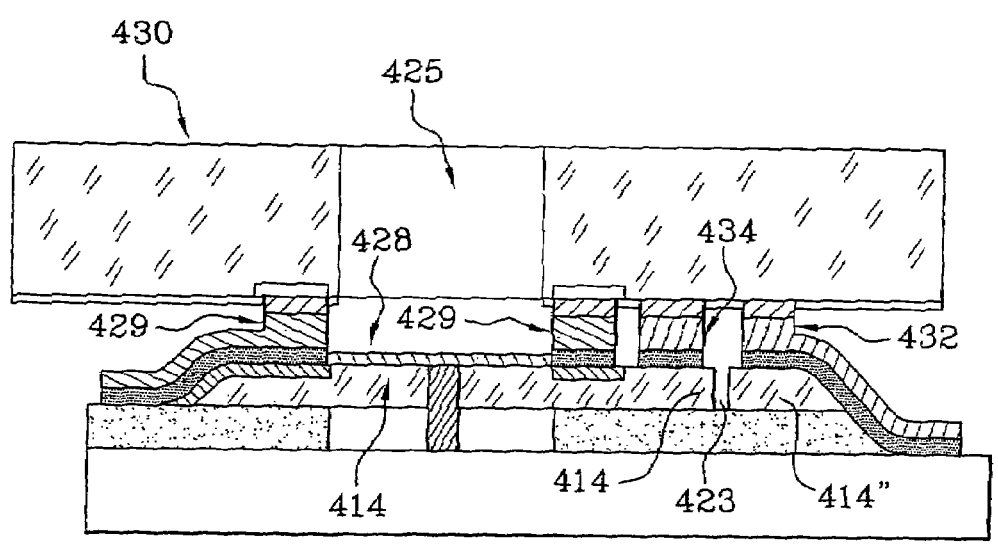
FIG. 14c is a schematic cross-section of an assembly of two lining supports according to the invention.

FIGS. 14A and 14B illustrate a specific embodiment of the invention for electromechanical devices requiring a selective lining during a phase known as the pre-conditioning phase. The support 10 is formed from a silicon wafer on which are micromachined electro-mechanical microstructures intended to be used in pressure sensors. FIGS. 14A and 14B represent one of these microstructures. The part 14B represents a cross section, the part 14A represents a top view. FIG. 14C represents a cross-section assembly of the microstructure and of an interconnection substrate.

The support 10 used comprises an SOI substrate (Silicon On Insulator) 412, covered with a layer of silica 410 and a layer of monocrystalline silicon 414. The local etching, for example by chemical etching of the layer of silica 410, enables a cell under vacuum 420 to be formed. The imperviousness of the cell 420 after etching is assured by means of a plug 421 that seals the cell under vacuum 420. The upper part of the cell under vacuum 420, consisting of a central part 414' of the layer 414 of monocrystalline silicon acts as a membrane 414' that deforms under the effect of pressure. This deformation results in a modification of a capacity measured between the two silicon planes 412 and 414 thanks to electrical contacts 416 and 418 formed by local deposition of gold, on the substrate 412 and the layer 414 respectively. In the embodiment shown here, the contact 416 also covers a part 414" of the layer 414, electrically insulated from the remainder of the layer 414 by an etching 423 of this layer. The layer 414 is a p type. A diode is formed at the surface of the layer 414 by an n type local implantation 422 formed on the whole circumference of the central part 414' of the layer 414. It should be noted that due to the fact of the formation of this junction between the membrane 414' and the n doped part 422 a potential of the membrane 414' is shifted compared to the potential of the deposits 427 and of a shared electrode 424, which will be discussed later, of a value corresponding to the threshold of the diode formed by said junction. It will be seen that due to this peripheral junction 422, the parts electrically connected to the shared electrode 424 through the intermediary of this junction may be protected from a lining whereas the part above the junction 422 is in the course of being lined. Naturally, the same result could have been obtained with a junction 422 not totally surrounding the central part 414'. It would be necessary in such a case to provide for an insulating part, the insulating part and the doped n part 422 together surrounding the central part 414'. According to this embodiment, a semi-conductor pad 414' of a first type is in electrical contact uniquely with a semi-conductive material 422 of a second type itself electrically coupled with a shared addressing contact 424 through a second conductive pad 427.

A first shared electrode 424 is formed by evaporation of a track of gold 424 connecting the different implantations 422 formed on the microstructure wafer. The different implantations 422 are themselves coated with a deposit of gold 427. Consequently, an electrical connection in gold exists between each of the deposits 427 and the shared electrode 424.

A second shared electrode 426, also formed by evaporation of a track of gold, enables all of the contacts 416 to be electrically connected to a second shared polarisation pad.

The first and second electrodes 424, 426 are called shared because they connect all of the implantations 422, and all of the contacts 416 of the supports 10 of a same wafer respectively.

As represented in FIG. 14C, the microstructure formed by the support 10 that has just been described is mechanically and electrically assembled with a substrate 430, known as an interconnection substrate, represented in cross-section in position assembled with the support 10 forming a microstructure for a sensor. Said interconnection substrate 430 may serve to place the support 10 in a casing or to house other components not represented together enabling the sensor to be formed. In the example represented, a window 425 is formed on the interconnection substrate 430 opposite to the membrane 414' to allow a direct mechanical contact of the membrane 414' with a medium in which one wishes to measure the pressure.

The mechanical and electrical connections between a support 10 and an interconnection substrate 430 are formed in the following manner. A conductive thermofusible material 432, 434 deposited on the support 10 above the contacts in gold 418, 416 assures a mechanical and electrical connection with the conductive parts of the interconnection substrate 430.

A mechanical connection is obtained by a lining 429 in insulating thermofusible material deposited above the gold coated part 427 surrounding the membrane 414'.

The membrane 414' is itself coated with a biocompatible lining 428. For a large number of applications, particularly in the biomedical field, it is necessary to functionalise the surface of the membrane 414' to give it for example biocompatibility properties or to limit cellular adhesion capable of contaminating the sensor. This functionalisation is achieved from a deposit 428 of controlled thickness making it possible not to change, in a significant manner, the elasticity of the membrane 414'. With baths containing for example vinylic monomers or cleavable cyclic molecules, one may form in particular coatings whose properties may be adjusted. Thus, the electro-grafting of hydroxy ethyl methacrylate (HEMA), methyl methacrylate (MMA), butyl methacrylate (BMA), poly ethylene glycol di-methacrylate (PEG-di-MA), N-vinyl pyrrolidone (NVP) and, more generally, activated vinylic monomers functionalised by substituents (molecular or macromolecular) of biocompatible nature, making it possible to obtain polymer films having good biocompatibility properties, particularly in the sense of the ISO 10993 Standard. The films obtained by electrografting are in general insulating at high grafting levels, but it is not rare to observe that the electrical insulation, particularly in solution, is with all the more reason favoured as the electrografted polymer is more hydrophobic.

A particularly suitable method for forming the assembly between the support 10 and the interconnection substrate 430 consists in assembling the support 10 after cutting, the front face turned towards the interconnection substrate 430 (known as the "flip-chip" method) using deposits of fusible material for the electrical and mechanical interconnections ("flip-chip polymer"). It has been seen above that on the one hand an insulating thermofusible material 429 assuring an impervious mechanical connection and on the other hand a conductive thermofusible material 432 assuring a mechanical and electrical connection are used for these electrical and mechanical connections.

The use of different linings 428, 429, 434, 432 on certain conductive pads of the front face of the structure 10 thus enables different supplementary functions to be provided. These linings are formed during a pre-conditioning step carried out in a collective manner simultaneously on all of the microstructures, therefore before cutting of the silicon substrate.

The microstructure 10 requires three different functionalisations that must be provided by different linings on electrically connected conductive surfaces. It involves a first lining 429 in insulating thermofusible polymer formed above the peripheral part 427 of the membrane 414', of a second lining 434 in conductive thermofusible polymer formed above the contacts 418, of a third biocompatible lining 428 formed above the membrane 414'. It should be noted that a conductive but not necessarily thermofusible lining 432 is also formed above the contacts 416 and tracks 426. These linings are formed by electro deposition as explained hereafter.

It is easy to use the selectivity stemming from the material as indicated above to dispose of a first means of selectivity. In the example shown here, a deposit of gold has been used on the parts that one wishes to differentiate from the silicon surfaces. The grafting potential for these two materials used in microelectronics is indeed sufficiently different to provide a first selectivity. The additional necessary selectivity is provided by an implementation of the addressing as proposed in the present invention carried out as explained above thanks to the junction 422 surrounding the central part 414'.

The first lining 429 is formed on all of the sealing joints by polarising the first shared electrode 424 to the potential V0 corresponding to the potential necessary for the lining 429 on gold.

The second lining 434 is formed on all of the contacts 418 by taking the first shared electrode 424 to a potential V1 corresponding to the potential necessary to the lining 434 on gold increased by the threshold of the diode created by the implantation 422. The membrane 414' is not lined at this stage because the grafting potential on silicon is higher than that on gold. One therefore again uses the selectivity due to the difference in nature between conductive materials electrically connected to each other.

The third lining 428 is formed on all of the membranes 414' by taking the first shared electrode 424 to a potential V2 corresponding to the potential necessary for the lining 428 on silicon increased by the threshold of the diode 422 cited above.

During these three operations, the second electrode 426 is maintained at a zero potential. The lining 432 of the contacts 416 is carried out separately from a lining 432. It may also be carried out simultaneously with the deposition of the second lining 434 by using a supplementary source making it possible to take the second shared electrode 426 to the potential V3 corresponding to the potential necessary for the lining 432 on gold.

The lining 429 corresponds for example to a layer of Poly Butyl MethAcrylate (PBMA).

The lining 434 corresponds for example to a layer of PBMA doped with silver salts, of around 0.5 μm thickness.

The lining 428 corresponds for example to a layer of poly-(PEG-dimethacrylate) of around 0.5 μm thickness. These layers are formed in baths of butyl methacrylate and PEG dimethacrylate, respectively, in dimethyl formamide (DMF) in the presence of tetraethyl ammonium perchlorate as electrolyte support.

DOCUMENTS CITED (1) WO-00/57467
(2) U.S. Pat. No. 6,137,183
(3) EP-0 924 756
(4) U.S. Pat. No. 6,140,144
(5) EP-0 038 244
(5) EP-0 500 415
(7) EP-0 499 528

The invention claimed is:

1. A lining support (10) comprising a plurality of conductive pads (12, 427, 418, 414') formed on a substrate, associated with a shared addressing contact (18, 424) and means of selecting at least one pad to be lined by electrochemical means, among the plurality of pads (12, 427, 418, 414'), characterised in that the selection means comprise resident means (20, 422, 414, 427, 418) of shifting a polarisation voltage that needs to be applied to the shared addressing contact (18, 424) to obtain a deposit (429) respectively (434) at the level of a first group of pads (12, 427, 418) electrically coupled to the shared addressing contact (18, 424) without obtaining a deposit on a second group of pads (12, 418, 414' 414') electrically connected to the same shared addressing contact (18, 424).

2. A lining support (10) according to claim 1, characterised in that the means (20, 422, 414, 427, 418, 414) of shifting the voltage to apply to the shared addressing contact (18, 424) are constituted by the fact that the conductive pads consist of a first conductive material (418, 427, 422, 414), the pads of the second group consisting of a second conductive material (418, 427, 422, 414) different to the first material.

3. A lining support (10) according to claim 2, characterised in that the first and second conductive materials (414, 422) consist of semi-conductor materials (414, 422) of the same nature having differing dopings.

4. A lining support (10) according to claim 1, characterised in that voltage shift means (20, 422, 414, 427, 418, 414) comprise threshold means comprising at least one diode (13, 422, 414) connected between the shared addressing contact (18, 424) and each of the pads (12, 414', 418) of the second group.

5. A lining support (10) according to claim 2, characterised in that voltage shift means (20, 422, 414, 427, 418, 414) comprise threshold means comprising at least one diode (13, 422, 414) connected between the shared addressing contact (18, 424) and each of the pads (12, 414', 418) of the second group.

6. A lining support (10) according to claim 3, characterised in that voltage shift means (20, 422, 414, 427, 418, 414) comprise threshold means comprising at least one diode (13, 422, 414) connected between the shared addressing contact (18, 424) and each of the pads (12, 414', 418) of the second group.

7. A lining support (10) according to claim 4, characterised in that the diode (13, 422, 414) is polarised in the open sense from the shared addressing contact (18, 424) to at least one conductive pad (12, 414', 418).

8. A lining support (10) according to claim 1, having conductive pads (12) lined by an electro-initiated lining, characterised in that the shift means comprise at least one electrical resistance (15) of value (R) sufficient to prevent the lining of the pads of the second group (12) under the application at the shared addressing contact (18) of a voltage allowing the lining of the pads (12) of the first group.

9. A lining support (10) according to claim 1, in which the resident means of shifting a polarisation voltage comprise at least one resistor (15) and at least one diode (13) in series.

10. A lining support (10) according to claim 1, comprising at least one conductive pad (12, 427, 418, 414') lined in the form of an element chosen among: a chemical test pad, a biological test pad, a fusible material anchoring pad, an electrical contact pad, a mechanical contact pad, a membrane, a seismic weight of an accelerometer and a condenser plate.

11. A lining support (10) according to claim 1, comprising a semi-conductive layer (414) of a first type of conductivity and, in the layer (414), a plurality of doped regions (422) of a second type of conductivity, each doped region of the second type of conductivity being connected to at least one conductive pad (414) constituting a surface of the substrate, and in which the doped regions of the second type (422) of conductivity form with the layer (414) diode voltage shift means.

12. A lining support (10) according to claim 1, in which the conductive pads (12) are arranged on a first face (101) of a substrate (14) and comprising on a face opposite (102) to the first face (101), a conductive layer (120), opposite conductive pads (12), the conductive layer forming a shared addressing contact (18).

13. A lining support (10) according to claim 1, in which the conductive pads (12) are arranged on a first face (101) of a substrate (14) and comprising on a face opposite (102) to the first face (101), a conductive layer (121), opposite the conductive pads (12), the conductive layer forming a shared addressing contact (18) and in which the substrate (14) has a resistivity of value sufficient to prevent the lining of at least one conductive pad (12) of the support (10) under the application at the shared addressing contact (18) of a voltage allowing the lining of at least one other pad (12) of the support (10).

14. A device, in particular sensor, comprising a support according to claim 1.

15. A sensor comprising a lining support according to claim 1, characterised in that a support of the sensor comprises conductive pads (427, 418, 414') formed by first (418) and second (414') materials different from each other, electrically in electrical contact with each other and bearing first (434) and second (428) linings respectively different from each other.

16. A sensor comprising a lining support according to claim 2, characterised in that a support of the sensor comprises conductive pads (427, 418, 414') formed by first (418) and second (414') materials electrically different from each other, in electrical contact with each other and bearing first (434) and second (428) linings respectively different from each other.

17. A sensor comprising a lining support according to claim 3, characterised in that a support of the sensor comprises conductive pads (427, 418, 414') formed by first (418) and second (414') materials electrically different from each other, in electrical contact with each other and bearing first (434) and second (428) linings respectively different from each other.

18. A sensor comprising a lining support according to claim 4 characterised in that a support of the sensor comprises conductive pads (427, 418, 414') formed by first (418) and second (414') materials electrically different from each other, in electrical contact with each other and bearing first (434) and second (428) linings respectively different from each other.

19. A sensor comprising a lining support according to claim 5, characterised in that a support of the sensor comprises conductive pads (427, 418, 414') formed by first (418) and second (414') materials electrically different from each other, in electrical contact with each other and bearing first (434) and second (428) linings respectively different from each other.

20. A sensor comprising a lining support according to claim 6, characterised in that a support of the sensor comprises conductive pads (427, 418, 414') formed by first (418) and second (414') materials electrically different from each other, in electrical contact with each other and bearing first (434) and second (428) linings respectively different from each other.

21. A sensor according to claim 16 characterised in that a support of the sensor comprises a first conductive pad (418) formed by a conductive material in electrical contact with a semi-conductor material of a first type (414), said material being in electrical contact uniquely with a semi-conductor material of a second type (422) itself in electrical contact with a shared addressing contact (424) by means of a second conductive pad (427), said first (418) and second (427) pads of a same conductive material bearing linings (429, 434) different from each other.

22. A sensor according to claim 16, characterised in that the different linings each comprise at least one electro-grafted lining.

23. A sensor according to claim 21, characterised in that the different linings each comprise at least one electro-grafted lining.

24. A lining method for forming a support comprising lined conductive pads, in which one brings into contact the pads of the support with at least one medium (34) containing a lining material, or a precursor of a lining material, and one applies at least one polarisation voltage between a shared addressing contact (18) and a reference electrode (32), method characterised in that
- one forms the conductive pads of the support with a first conductive material and others with a second conductive material, or
- one forms on the support voltage shift means arranged between the common addressing contact and the first pads, in such a way that a voltage applied to the shared addressing contact corresponds to a first voltage value on the first pads and to a second voltage value on the second pads, or
- one applies to the shared addressing contact a sufficient voltage to initiate the lining of the first pads, and insufficient to allow the lining of the second conductive pads.

25. A lining method according to claim 24, characterised in that the lining material, or the precursor of the lining material, leads, for at least one of the pads, to an electro-initiated lining.

26. A lining method according to claim 24, characterised in that one uses a support in which the voltage shift means are threshold means, and in which one carries out a lining by electro-monitored or electro-initiated means.

27. A lining method according to claim 24, characterised in that one uses a support in which the voltage shift means comprise at least one resistance and in which one carries out a lining by electro-initiated means.

28. A lining method according to claim 25, in which one applies the polarisation voltage by carrying out at least one scan between a voltage less than or equal to a lining threshold voltage (Vg, VgA, VgB) and greater than or equal to a saturation voltage (Vsat, VsatA, VsatB).

29. A lining method according to claim 25, in which one forms a passivation lining in at least one first step of the method, by bringing into contact conductive pads with a first medium and in which, during a subsequent lining step, one brings into contact the conductive pads with a second medium, to line the pads left unlined during the first lining step, or a previous lining step.

30. A lining method according to claim 25, in which one brings into contact the conductive pads with at least one medium suited to an electro-initiated lining, comprising at least one compound chosen from among vinylic monomer, cyclic monomers, diazonium salts, iodonium salts, sulphonium salts and phosphonium salts, and mixture thereof.

31. A lining method according to claim 24, in which brings into contact the pads of the support with at least one medium suited to an electro-monitored lining, comprising at least one compound chosen from among a metallic salt or a polymer and in particular a poly-electrolyte, or a precursor of conductive polymers, and particularly pyrrole, thiophene, aniline, or derivates thereof, or an electropolymerisable monomer such as phenols, ethylene diamine and, more generally, diamines.

* * * * *